(12) United States Patent
Tobita

(10) Patent No.: US 8,736,763 B2
(45) Date of Patent: May 27, 2014

(54) CONTENT PROCESSING APPARATUS AND CONTENT SYNCHRONIZING METHOD

(75) Inventor: Yoshikata Tobita, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 131 days.

(21) Appl. No.: 13/460,461

(22) Filed: Apr. 30, 2012

(65) Prior Publication Data

US 2013/0088640 A1 Apr. 11, 2013

(30) Foreign Application Priority Data

Oct. 11, 2011 (JP) .................................. 2011-224299

(51) Int. Cl.
*H04N 7/00* (2011.01)
*H04N 11/00* (2006.01)

(52) U.S. Cl.
USPC ........... 348/552; 348/553; 348/569; 348/570; 348/584; 348/500; 348/656; 348/693; 348/180; 348/441; 348/723; 348/725; 348/729; 348/731; 348/734; 725/17; 725/29; 725/32; 725/90; 725/116; 725/117; 725/118; 715/203; 715/220; 375/259; 370/350; 370/324

(58) Field of Classification Search
USPC ......... 348/552, 553, 569, 570, 584, 500, 656, 348/693, 723, 725, 729, 731; 715/203, 220; 725/17, 29, 32, 90, 116, 117, 118; 375/259; 370/350
See application file for complete search history.

(56) References Cited

U.S. PATENT DOCUMENTS

| | | | |
|---|---|---|---|
| 7,269,843 B2 * | 9/2007 | Yamaguchi et al. | 725/141 |
| 7,428,696 B2 | 9/2008 | Shin | |
| 2002/0059614 A1 * | 5/2002 | Lipsanen et al. | 725/75 |
| 2004/0252726 A1 * | 12/2004 | Matsumoto | 370/503 |
| 2006/0079977 A1 * | 4/2006 | Nagai et al. | 700/94 |
| 2006/0178963 A1 * | 8/2006 | Masuyama | 705/35 |
| 2006/0233266 A1 * | 10/2006 | Suetsugu | 375/259 |
| 2008/0301746 A1 * | 12/2008 | Wiser et al. | 725/114 |
| 2008/0301750 A1 * | 12/2008 | Silfvast et al. | 725/131 |
| 2010/0031162 A1 * | 2/2010 | Wiser et al. | 715/747 |
| 2010/0036860 A1 * | 2/2010 | Hiura et al. | 707/101 |
| 2010/0174680 A1 * | 7/2010 | Yamagishi et al. | 707/622 |
| 2010/0265398 A1 * | 10/2010 | Johnson et al. | 348/500 |

(Continued)

FOREIGN PATENT DOCUMENTS

| | | |
|---|---|---|
| JP | 2005-191786 | 7/2005 |
| JP | 2007-183654 | 7/2007 |
| JP | 4288214 | 4/2009 |
| JP | 4369271 | 9/2009 |

*Primary Examiner* — Jefferey Harold
*Assistant Examiner* — Mustafizur Rahman
(74) *Attorney, Agent, or Firm* — Patterson & Sheridan LLP

(57) ABSTRACT

According to one embodiment, a content synchronizing method includes: first transmitting when receiving an acquiring request for reference time to determine a timing to synchronize a plurality of pieces of content executed by a plurality of modules with each other from a first module out of the modules, the acquiring request for the reference time to a second module out of the modules; receiving source information indicating an acquisition source of the reference time from the second module; and acquiring reference time information indicating the reference time from the acquisition source indicated by the source information, wherein second transmitting to the first module, together with the reference time information, processing time information indicating processing time from receiving the acquiring request until transmitting the reference time information, the processing time information being used to calculate a time lag between time in the first module and the reference time.

7 Claims, 8 Drawing Sheets

(56) References Cited

U.S. PATENT DOCUMENTS

| | | | |
|---|---|---|---|
| 2011/0090897 A1* | 4/2011 | Johnson et al. | 370/350 |
| 2011/0277011 A1* | 11/2011 | Suzuki et al. | 725/149 |
| 2012/0082424 A1* | 4/2012 | Hubner et al. | 386/219 |
| 2012/0162512 A1* | 6/2012 | Johnson et al. | 348/515 |
| 2012/0176485 A1* | 7/2012 | Miyauchi et al. | 348/56 |

* cited by examiner

FIG.3

| ACQUISITION SOURCE OF REFERENCE TIME | BROADCAST-DEDICATED CONTENT |
|---|---|
| OFFSET TO REFERENCE TIME OF ACQUISITION SOURCE | 0:10:00 |
| REPRODUCTION SPEED AT ACQUISITION SOURCE | NORMAL SPEED |

FIG.6

| ACQUISITION SOURCE OF REFERENCE TIME | SYSTEM CLOCK OF WEB SERVER |
|---|---|
| OFFSET TO REFERENCE TIME OF ACQUISITION SOURCE | 12:15:00 AUGUST 31, 2011 |
| REPRODUCTION SPEED AT ACQUISITION SOURCE | DOUBLE SPEED |

CONTENT PROCESSING APPARATUS AND CONTENT SYNCHRONIZING METHOD

CROSS-REFERENCE TO RELATED APPLICATIONS

This application is based upon and claims the benefit of priority from Japanese Patent Application No. 2011-224299, filed Oct. 11, 2011, the entire contents of which are incorporated herein by reference.

FIELD

Embodiments described herein relate generally to a content processing apparatus and a content synchronizing method.

BACKGROUND

In recent years, communication environments such as the Internet have been well developed even for households. While broadcasts excel in simultaneous reporting, communications excel in transmitting individual information. Using such characteristics of broadcasts and communications, delivery systems such as Hybridcast (registered trademark), which integrates content acquired from broadcasts and from communications to allow provision of high-value added content, have been developed.

In such a delivery system as Hybridcast, a display terminal such as a television receiver acquires content based on broadcast signals and acquire content by communications accessing to a server via a communication line such as the Internet. The display terminal can then combine and display the content based on broadcast signals (hereinafter referred to as broadcast content) and the content acquired by communications.

Furthermore, a user can use a plurality of display terminals to display thereon a plurality of pieces of related content.

When the respective display terminals display different content from each other and the content displayed has relevance to each other, it is desirable to synchronize the timing of the display. Accordingly, several technologies have been developed to synchronize among a plurality of display terminals.

In the conventional technologies, video data is synchronized among a plurality of terminals according to time information simultaneously transmitted from a server. To synchronize web content and the like among the terminals, it is necessary to acquire time information from a server successively and continuously, whereby burdens on the terminals, the server, and transmission paths are increased.

In view of the foregoing, the present invention provides a content processing apparatus and a content synchronizing method that reduce the burdens of synchronizing content among a plurality of terminals.

BRIEF DESCRIPTION OF THE DRAWINGS

A general architecture that implements the various features of the invention will now be described with reference to the drawings. The drawings and the associated descriptions are provided to illustrate embodiments of the invention and not to limit the scope of the invention.

FIG. 3 is an exemplary table illustrating an example of acquisition source information in the first embodiment;

FIG. 6 is an exemplary table illustrating an example of acquisition source information in the second embodiment;

DETAILED DESCRIPTION

In general, according to one embodiment, a content processing apparatus comprises: a transmitter configured to transmit, when the transmitter receives an acquiring request for reference time to determine a timing to synchronize a plurality of pieces of content executed by a plurality of executing modules with each other from a first executing module out of the executing modules, the acquiring request for the reference time to a second executing module out of the executing modules; a receiver configured to receive acquisition source information indicating an acquisition source of the reference time from the second executing module; and an acquiring module configured to acquire reference time information indicating the reference time from the acquisition source indicated by the acquisition source information, wherein the transmitter is further configured to transmit to the first executing module, together with the reference time information, processing time information indicating processing time from receiving the acquiring request until transmitting the reference time information, the processing time information being used to calculate a time lag between time in the first executing module and the reference time.

First Embodiment

Figure 1:
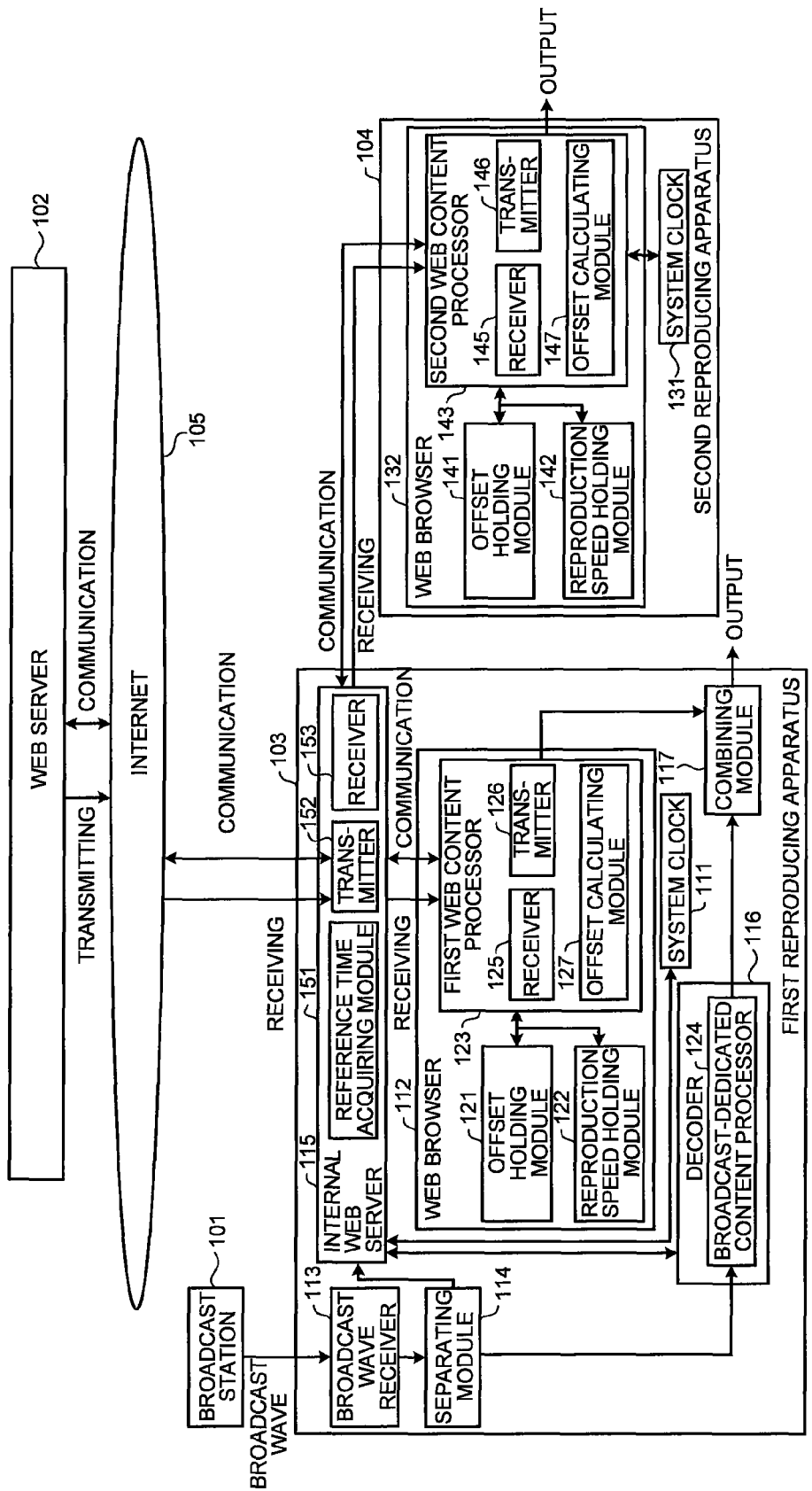
FIG. 1 is an exemplary block diagram schematically illustrating a content processing system comprising a plurality of reproducing apparatuses, a broadcast station, and a web server according to a first embodiment.

FIG. 1 is a schematic block diagram illustrating a content processing system comprising a plurality of reproducing apparatuses, a broadcast station, and a web server according to a first embodiment. In the present embodiment, an example of a content processing apparatus being applied to a reproducing apparatus will be explained. However, the content processing apparatus may be applied to other devices such as a web server. While an example that includes two reproducing apparatuses is explained in the present embodiment, the number of reproducing apparatuses is not restricted and thus, the content processing system may include three reproducing apparatuses or more.

A broadcast station 101 transmits a broadcast signal carried on a broadcast wave. A first reproducing apparatus 103 receives the broadcast signal. The first embodiment is an example in which the first reproducing apparatus 103 receives broadcast signals while a second reproducing apparatus 104 does not receive broadcast signals.

The Internet 105 is used as a communication line connecting among the first reproducing apparatus 103, the second reproducing apparatus 104, and a web server 102. The first reproducing apparatus 103 and the second reproducing apparatus 104 communicate with the web server 102 via the Internet 105 to acquire a variety of web content. The access destinations of the first reproducing apparatus 103 and the second reproducing apparatus 104 (for example, the web server 102) are specified based on content-acquiring content included in the broadcast signal from the broadcast station 101.

The web server 102 delivers a variety of web content to the first reproducing apparatus 103 and the second reproducing apparatus 104. The web content includes the content such as a computer program to carryout communications with other users that defines control by JavaScript (registered trademark), Hypertext Markup Language (HTML), or the like, and the content to which videos, sounds, images, and such are output.

The first reproducing apparatus 103 in the present embodiment is, for example, a television receiver, and the second reproducing apparatus 104 is, for example, a tablet display terminal. The first reproducing apparatus 103 and the second reproducing apparatus 104 belong to, for example, a network in the same household.

The first reproducing apparatus 103 comprises a system clock 111, a web browser 112, a broadcast wave receiver 113, a separating module 114, an internal web server 115, a decoder 116, and a combining module 117.

The system clock 111 is a clock built in the first reproducing apparatus 103 and outputs time information. The system clock 111 is connected with a time synchronization server (not depicted) via the Internet 105, and the time thereof is automatically adjusted.

The broadcast wave receiver 113 receives a broadcast signal from the broadcast station 101. The broadcast wave receiver 113 comprises a tuner and a demodulator (not depicted), and receives broadcast signals and tunes to the signal of a channel specified by a channel selecting operation of a user. The broadcast wave receiver 113 carries out a demodulation process to the broadcast signal tuned corresponding to the broadcasting system thereof. For example, the broadcast wave receiver 113 carries out, for a broadcast signal of digital broadcasting, a digital demodulation process such as phase shift keying (PSK) demodulation or orthogonal frequency division multiplexing (OFDM) demodulation. The broadcast wave receiver 113 thus acquires a stream that includes desired content from the broadcast signal. The broadcast wave receiver 113 then outputs the stream, after being decoded, to the separating module 114.

The separating module 114 extracts broadcast-dedicated content of a desired program from the decoded result, and at the same time, separates content-acquiring content from a data broadcasting that is multiplexed to the broadcast signal. The separating module 114 outputs the broadcast-dedicated content to the decoder 116. The separating module 114 further outputs the content-acquiring content to the internal web server 115 to cause the internal web server 115 to store therein the content-acquiring content.

As such, the broadcast signal in the present embodiment includes the content-acquiring content to acquire content from the web server 102 (hereinafter referred to as web content) via the Internet 105. For example, the content-acquiring content is the content where the control to acquire web content from the web server 102 is defined by JavaScript (registered trademark), HTML, and such. The content-acquiring content includes, for example, a URL indicating an access destination of the web content that the web server 102 delivers. The access destination is not restricted to the web server 102, and may be distributed to a plurality of web servers.

The internal web server 115 delivers the content-acquiring content separated from the separating module 114 to each of the first reproducing apparatus 103 and the second reproducing apparatus 104. In the present embodiment, the content-acquiring content delivered is different for each of the reproducing apparatuses.

The web browser 112 is an application software to browse a variety of content provided on the Internet 105, and in the present embodiment, comprises an offset holding module 121, a reproduction speed holding module 122, and a first web content processor 123.

The web content to be processed by the first web content processor 123 includes, other than video data, sound data, image data, and such, a computer program in JavaScript (registered trademark) or the like that can define various types of control such as an application to perform communications with other users. For example, when the content-acquiring content or the web content is a script, a script engine that executes the script is included as the first web content processor 123.

The first web content processor 123 acquires web content from the web server 102 according to the content-acquiring content provided from the internal web server 115, and executes the web content.

The first web content processor 123 then outputs to the combining module 117 image data generated by interpreting communication content acquired based on the content-acquiring content. The content-acquiring content may be described with a script or a computer program to carry out bidirectional communications with the web server 102. In this case, the first web content processor 123 executes the script or the program and generates image data representing information acquired by the intercommunication with the web server 102 to output the image data to the combining module 117. The information acquired by the intercommunication includes input information entered by other users via a social network service (SNS) and the like.

Figure 2:
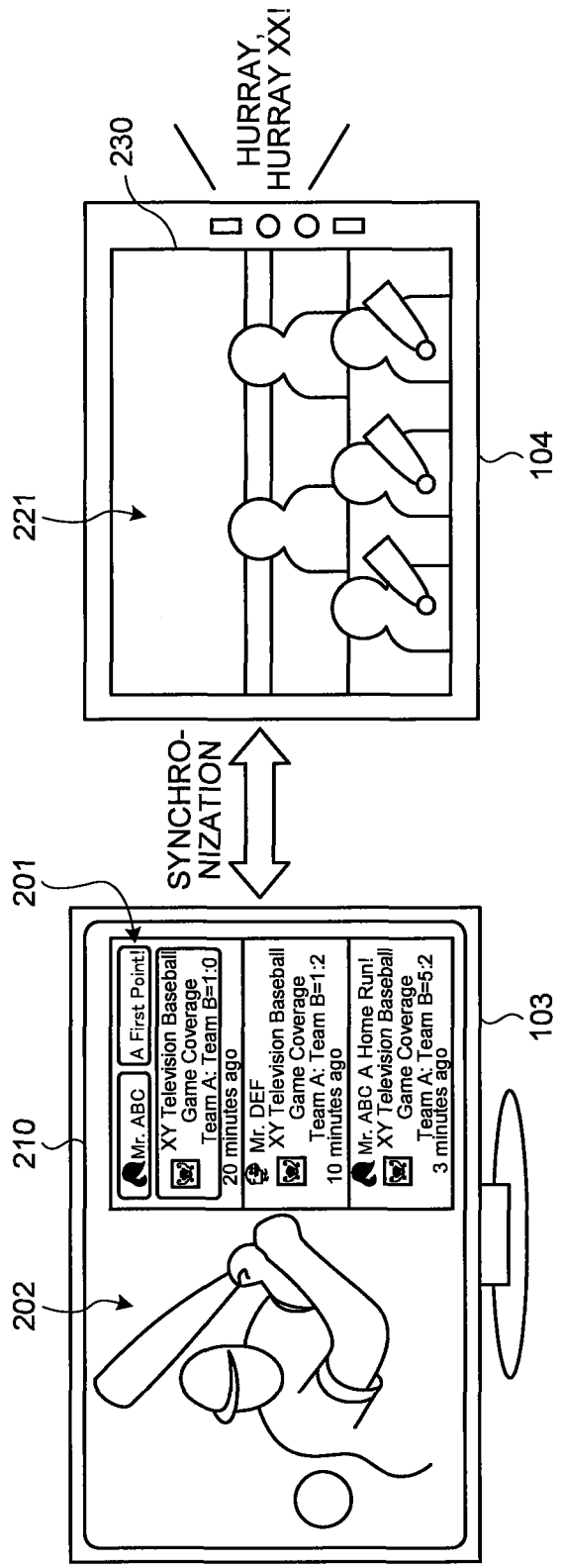
FIG. 2 is an exemplary diagram illustrating examples of content displayed on a first reproducing apparatus and on a second reproducing apparatus in the first embodiment.

FIG. 2 is a diagram illustrating examples of content displayed by the first reproducing apparatus 103 and the second reproducing apparatus 104 in the first embodiment. As illustrated in FIG. 2, in the first reproducing apparatus 103, broadcast-dedicated content 202 and web content 201 are displayed on a display device 210 being combined. Meanwhile, in the second reproducing apparatus 104, streaming 221 (i.e., web content) received via the Internet 105 is displayed on a display panel 230.

The respective pieces of content (for example, the web content 201 and the streaming 221) need to be synchronized with each other to give a sense of presence to the user. Therefore, in the present embodiment, control to synchronize the respective pieces of content is carried out in the first reproducing apparatus 103 and in the second reproducing apparatus 104.

The web browser in each of the reproducing apparatuses carries out a process according to the time of the system clock built in the respective reproducing apparatuses. However, the system clock of each of the reproducing apparatuses may indicate a different time from each other. For this reason, when each of the web browsers processes the content based on the time output from the system clock, it is conceivable that the content may not be synchronized among the reproducing apparatuses.

Accordingly, in the present embodiment, the web content processor in the web browser of each of the reproducing apparatuses processes the web content acquired from the internal web server 115 according to reference time information. More specifically, the first web content processor 123 in the web browser 112 of the first reproducing apparatus 103 and a second web content processor 143 in a web browser 132 of the second reproducing apparatus 104 comply with the reference time information when executing the respective pieces of web content, whereby the synchronization among the pieces of web content is made possible.

The reference time information is the time information to determine the time to synchronize a plurality of pieces of content to be executed. In other words, a plurality of web content processors share the reference time information, thereby allowing a plurality of pieces of content to be synchronized with each other.

In the present embodiment, a plurality of reproducing apparatuses in a network in the same household determine the time to execute the respective pieces of content with reference to the reference time information. Consequently, for example, when a user watches a sport game that is broadcast-dedicated content, the game displayed by the first reproducing apparatus 103 can be synchronized with the interjections and the streaming showing spectators watching the game that are output by the second reproducing apparatus 104. In another example, when a user watches a quiz show, the video of the quiz show by the first reproducing apparatus 103 can be synchronized with the display of reception of an answer to a quiz and a score of answers by the second reproducing apparatus 104.

Accordingly, in the present embodiment, by sharing a reference time, out of content widely delivered using broadcast waves or the Internet, web content executed in a reproducing apparatus can be synchronized with web content executed in other reproducing apparatuses.

Each of the reproducing apparatuses in the present embodiment does not acquire the reference time information successively, but holds an offset time indicating a difference between the time indicated by the system clock built in the respective reproducing apparatuses and the reference time.

The offset holding module 121 of the first reproducing apparatus 103 holds the offset time indicating a time lag between the time information output by the system clock 111 and the reference time information.

The reproduction speed holding module 122 holds a reproduction speed of content at which the first web content processor 123 executes.

In the first web content processor 123 of the first reproducing apparatus 103, the execution of the content is controlled according to a reference time obtained by adding the offset time to the time information output from the system clock 111. This allows sharing of the same time with the web content processors (for example, the second web content processor 143) of the other reproducing apparatuses (for example, the second reproducing apparatus 104) even when there is a time lag and such in the system clock 111. In other words, the content executed by a plurality of reproducing apparatuses can be synchronized with each other.

The first web content processor 123 further comprises a receiver 125, a transmitter 126, and an offset calculating module 127 and carries out, other than carrying out processing of web content, the control to acquire the reference time information.

The transmitter 126 transmits an acquiring request for reference time to the internal web server 115.

The receiver 125 receives from the internal web server 115 the reference time information, processing time information of the server, and a reproduction speed of acquisition source.

The processing time information of the server is the information indicating a processing time for the internal web server 115 from receiving an acquiring request from the first web content processor 123 until transmitting the reference time information to the first web content processor 123. The reproduction speed of acquisition source is the reproduction speed of content (broadcast-dedicated content, web content, or content-acquiring content) in the acquisition source. A plurality of web content processors execute web content according to the reproduction speed, thereby allowing the web content processors to synchronize the content with each other.

The offset calculating module 127 calculates an offset time of the system time using the following calculating expression.

Offset time of system time=System time at the start of an acquiring request for reference time to the internal web server 115+(Total processing time−Server processing time)/2−Reference time/Reproduction speed    Expression 1

In Expression 1, the system time at the start of an acquiring request for reference time to the internal web server 115 is the system time of the transmitter 126 transmitting the acquiring request. The total processing time is the time from the acquiring request being transmitted from the first web content processor 123 to the internal web server 115 until the reference time information from the internal web server 115 being received by the first web content processor 123. The server processing time is the time information received from the internal web server 115, and is the time for the internal web server 115 from receiving the acquiring request until transmitting the reference time information. The reproduction speed represents the reproduction speed of the content and such acquired from the acquisition source of reference time.

In the middle of Expression 1, the value calculated by dividing by two a time obtained by subtracting the server processing time from the total processing time represents a one-way communication time required for communications between the first web content processor 123 and the internal web server 115.

When the reproduction speed is unified like each of the reproducing apparatuses reproduces the content at normal speed, the reproduction speed may not need to be included in Expression 1 as a parameter.

The offset time calculated by the offset calculating module 127 is held by the offset holding module 121. The first web content processor 123 further makes the reproduction speed holding module 122 hold the reproduction speed acquired from the acquisition source.

The first web content processor 123 then executes the content according to a reference time that is the system time output from the system clock 111 added with the offset time held by the offset holding module 121 and to the reproduction speed held by the reproduction speed holding module 122.

The present embodiment is exemplified such that the first web content processor 123 is used as a reference for a plurality of pieces of web content to synchronize with. Accordingly, when the internal web server 115 receives an acquiring request for reference time from any of the web content processors (in the present embodiment, the first web content processor 123 and the second web content processor 143), the internal web server 115 transmits the acquiring request to the first web content processor 123. While the first web content processor 123 is exemplified as a reference to synchronize with by the reference time in the present embodiment, any of the web content processors may be defined as the reference.

When the receiver 125 of the first web content processor 123 receives an acquiring request for reference time from the internal web server 115, the first web content processor 123 acquires acquisition source information indicating an acquisition source of reference time and such. As for the acquiring method of acquisition source information, any method may be used and, for example, it can be contemplated that it is preset to the content (content-acquiring content or web content) executed by the first web content processor 123.

The transmitter 126 then transmits the acquisition source information to the internal web server 115.

FIG. 3 is a table illustrating an example of acquisition source information in the present embodiment. As illustrated in FIG. 3, the acquisition source information comprises an acquisition source of reference time, an offset to reference time of acquisition source, and a reproduction speed at acquisition source.

The acquisition source of reference time is the information indicating the acquisition source of reference time. As for the acquisition source of reference time, for example, the reproducing time of broadcast-dedicated content and the time of system clock of a reproducing apparatus or a web server can be contemplated.

The offset to reference time of acquisition source is the time defined as the starting time by the web content with reference to the time of the acquisition source. The reproduction speed at acquisition source is the reproduction speed of content and such. Setting the reproduction speed allows preventing a time-lag between the content by the difference in reproduction speed.

The internal web server 115 in the present embodiment further comprises a reference time acquiring module 151, a transmitter 152, and a receiver 153, and other than delivering the content, provides the reference time information and the information necessary for synchronization in response to the acquiring request for reference time from each of the web browsers (the web browsers 112, 132).

In the present embodiment, synchronizing one web content executed by the first web content processor 123 with the other web content executed by the second web content processor 143 is exemplified.

To realize the synchronization, when the transmitter 152 of the internal web server 115 receives an acquiring request for reference time from any one of the web content processors (the first web content processor 123 and the second web content processor 143), the transmitter 152 transmits the acquiring request to the first web content processor 123.

The receiver 153 of the internal web server 115 receives the acquisition source information indicating the acquisition source of reference time and such from the first web content processor 123.

The reference time acquiring module 151 of the internal web server 115 acquires the reference time information indicating reference time from the acquisition source indicated by the acquisition source information. In the present embodiment, the reference time acquiring module 151 derives the reference time information from the following Expression 2.

Reference time information=(Information indicating reference time acquired from acquisition source− Offset to reference time of acquisition source)× Reproduction speed at acquisition source   Expression 2

The transmitter 152 of the internal web server 115 then transmits the reference time information, the server processing time information, and the reproduction speed at acquisition source to the web content processor (the first web content processor 123 or the second web content processor 143) of acquiring request source. The server processing time information is the information indicating a processing time for the internal web server 115 from receiving the acquiring request from the web content processor until transmitting the reference time information, and is used to calculate an offset time indicating a time lag between the system time and the reference time.

The decoder 116 comprises a broadcast-dedicated content processor 124. The broadcast-dedicated content processor 124 carries out an appropriate signal processing to the broadcast-dedicated content received. The decoder 116 then acquires a video signal and a sound signal of the program from the broadcast-dedicated content after the signal processing being carried out and outputs the signals to the combining module 117.

The combining module 117 combines the video signal and the sound signal of the program after the signal processing being carried out by the decoder 116 with the content output from the web browser 112 and outputs the video signal and the sound signal combined. The video signal combined is displayed on a display (not depicted). Accordingly, in the present embodiment, the video signal by the broadcast-dedicated content and the content acquired by communications are displayed on the display of the first reproducing apparatus 103 being superposed.

Next, the second reproducing apparatus 104 will be explained. The second reproducing apparatus 104 comprises a system clock 131 and the web browser 132.

The system clock 131 is a clock built in the second reproducing apparatus 104 and outputs time information. The system clock 131 is not connected with a time synchronization server (not depicted). Therefore, a time lag to the time of the system clock 111 in the first reproducing apparatus 103 may arise.

The web browser 132 comprises an offset holding module 141, a reproduction speed holding module 142, and the second web content processor 143. The offset holding module 141 and the reproduction speed holding module 142 are the same as the offset holding module 121 and the reproduction speed holding module 122 of the first reproducing apparatus 103, respectively, and thus, their explanations are omitted.

The second web content processor 143 comprises a receiver 145, a transmitter 146, and an offset calculating module 147. The receiver 145 and the transmitter 146 carry out receiving and transmitting of information with the internal web server 115, respectively. The receiving and transmitting processes of the receiver 145 and the transmitter 146 are the same as those of the receiver 125 and the transmitter 126 of the first reproducing apparatus 103 and thus, their explanations are omitted. The process carried out by the offset calculating module 147 is the same as that of the offset calculating module 127 of the first reproducing apparatus 103 and thus, its explanation is omitted.

The second web content processor 143 is delivered with content-acquiring content from the internal web server 115. Processing the content-acquiring content enables the second web content processor 143 to acquire the web content from the web server 102 and execute it. The second web content processor 143 then executes the web content according to the reference time information to achieve synchronization with the other web content.

Figure 4:
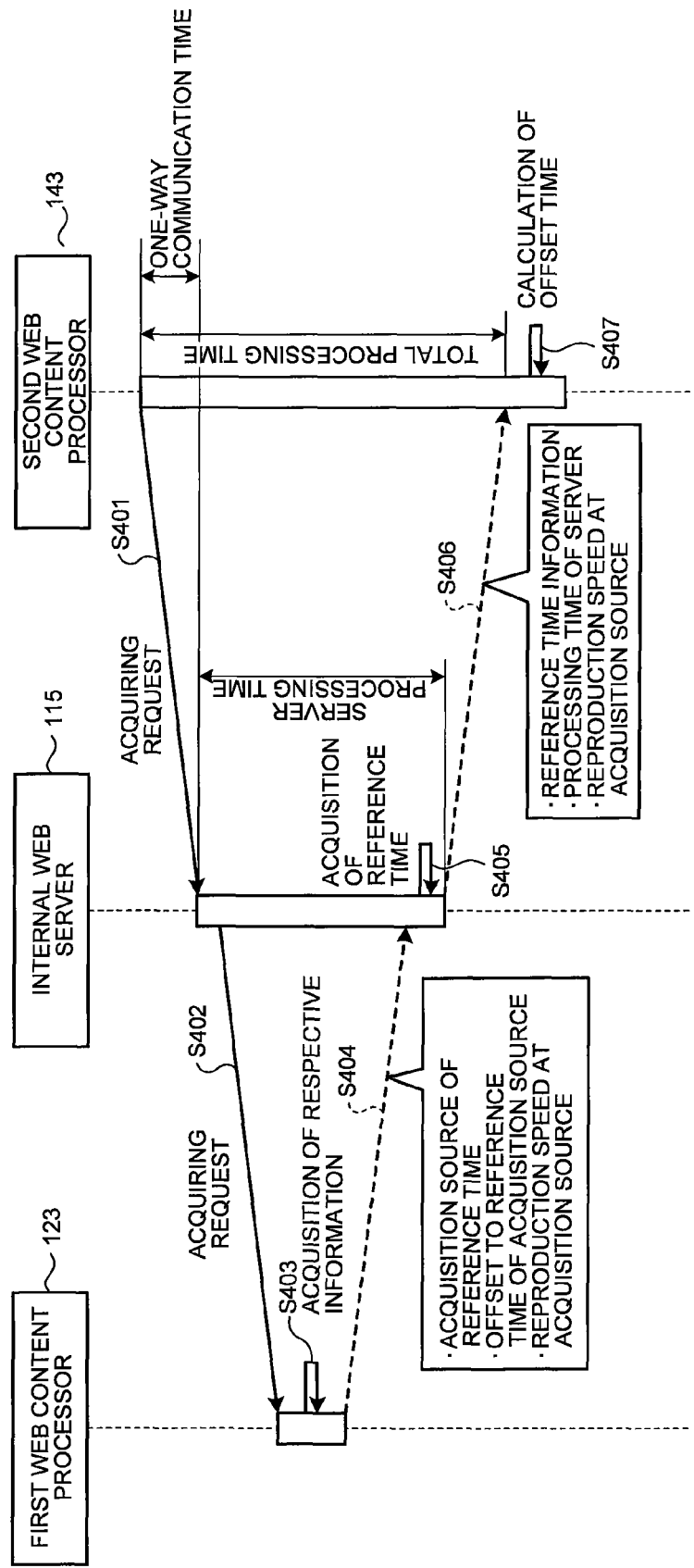
FIG. 4 is an exemplary flowchart illustrating a procedure of a process performed in response to an acquiring request in the content processing system in the first embodiment.

Next, the process carried out in response to an acquiring request from a web content processor will be explained. FIG. 4 is a flowchart illustrating a procedure of the above-described content processing system (the first web content processor 123, the second web content processor 143, and the internal web server 115) in the present embodiment.

The transmitter 146 of the second reproducing apparatus 104 first transmits an acquiring request for reference time to the internal web server 115 (S401). In FIG. 4, the acquiring request for reference time being carried out by the second web content processor 143 is exemplified. However, it only needs to be a web content processor in a reproducing apparatus belonging to a network of the same household.

When the receiver 153 of the internal web server 115 receives the acquiring request for reference time, the transmitter 152 of the internal web server 115 transmits the acquiring request for reference time to the first web content processor 123 (S402).

Subsequently, when the first web content processor 123 receives the acquiring request for reference time, the first web content processor 123 acquires information concerning reference time according to meta-information in the content-acquiring content provided from the internal web server 115 or in the web content acquired from the web server 102 (S403). The information concerning reference time includes an acquisition source of reference time, an offset to reference time of acquisition source, and a reproduction speed at acquisition source.

The transmitter 126 of the first web content processor 123 transmits the information concerning reference time (the acquisition source of reference time, the offset to reference time of acquisition source, and the reproduction speed at acquisition source) to the internal web server 115 (S404).

When the receiver 153 of the internal web server 115 receives the information concerning reference time (the acquisition source of reference time, the offset to reference time of acquisition source, and the reproduction speed at acquisition source), the reference time acquiring module 151 then acquires the reference time information from the acquisition source of reference time (S405). On this occasion, the reference time acquiring module 151 also carries out the adjustment of reference time using the offset to reference time of acquisition source. The explanation of acquiring method of reference time information is omitted because the reference time information is calculated by the above-described process using Expression 2.

In the present embodiment, it is exemplified that the information indicating reference time at the time of acquiring is transmitted to the web content processor as the reference time information. However, any information may be transmitted as long as the information can be recognized as the reference time by the web content processor.

The transmitter 152 of the internal web server 115 then transmits the processing time of the server, the reference time information acquired at S405, and the reproduction speed at acquisition source (S406). The processing time of the server is the time from receiving the acquiring request at S401 until transmitting the reference time information at S406.

After the receiver 145 of the second web content processor 143 receives the processing time of the server, the reference time information, and the reproduction speed at acquisition source, the offset calculating module 147 then calculates an offset time between the reference time and the system time based on the system time of the system clock 131 in addition to the processing time of the server, the reference time information, and the reproduction speed at acquisition source received, and makes the offset holding module 141 hold the offset time (S407). The explanation of calculating method of offset time is omitted because the offset time is calculated by the above-described process using Expression 1.

The web content executed by the first web content processor 123 is combined with the decoded result of the broadcast-dedicated content output from the decoder 116 in the combining module 117 and is output being synchronized with the reference time, i.e., the reproducing time of the broadcast-dedicated content. Meanwhile, the second web content processor 143 processes the content according to the reference time derived from the calculated offset time and the system time, whereby the synchronization of web content with the first web content processor 123 can be realized.

In the sequence illustrated in FIG. 4, an example of the acquiring request for reference time being transmitted from the second web content processor 143 is explained. However, the web content processors in all of the reproducing apparatuses synchronized need to carry out the sequence illustrated in FIG. 4. More specifically, the first web content processor 123 of the first reproducing apparatus 103 also needs to transmit an acquiring request for reference time to the internal web server 115. In this case, the first web content processor 123 of the first reproducing apparatus 103 transmits the acquiring request to the internal web server 115, and the internal web server 115 transmits the acquiring request to the first web content processor 123. The processes other than that are the same as those explained in the foregoing and thus, their explanations are omitted.

In the first embodiment, the first web content processor 123 in the web browser 112 of the first reproducing apparatus 103 and the second web content processor 143 in the web browser 132 of the second reproducing apparatus 104 carry out the processes of content according to the reference time information, whereby a plurality of pieces of content executed by the different reproducing apparatuses can be synchronized with each other.

Second Embodiment

In the first embodiment, a web server that provides content to web browsers being built in the first reproducing apparatus 103 is exemplified. However, the transmitting destination of an acquiring request for reference time is not restricted to the web server built in the reproducing apparatus belonging to a network in a household, and the acquiring request for reference time may be transmitted to an external server connected via the Internet 105. Therefore, in a second embodiment, an example of transmitting an acquiring request for reference time to a web server 502 will be explained.

Figure 5:
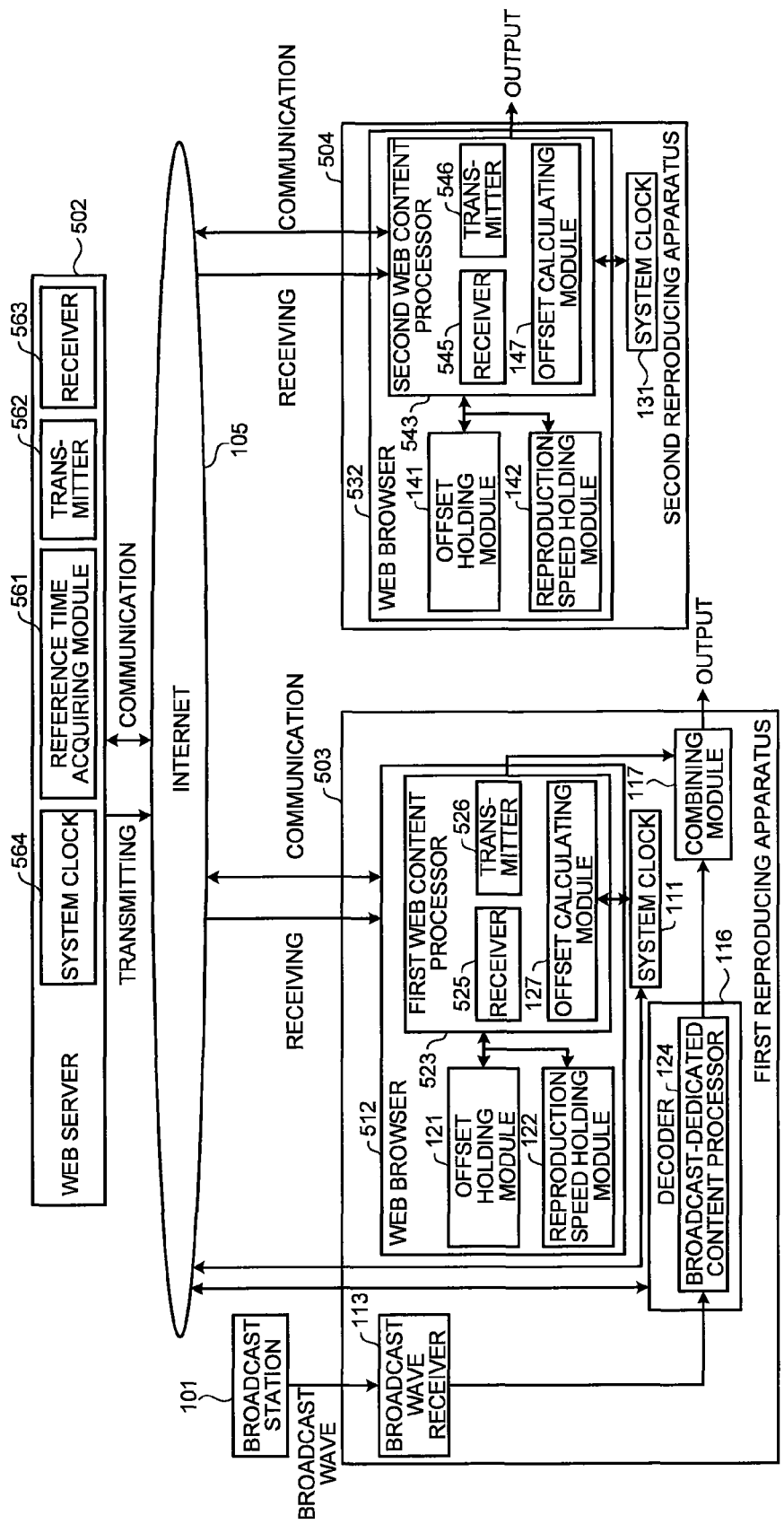
FIG. 5 is an exemplary block diagram schematically illustrating a content processing system comprising a plurality of reproducing apparatuses, a broadcast station, and a web server according to a second embodiment.

FIG. 5 is a schematic block diagram illustrating a content processing system comprising a plurality of reproducing apparatuses, a broadcast station, and a web server according to the second embodiment.

The second embodiment is an example in which a first reproducing apparatus 503 has the function of receiving broadcast signals and a second reproducing apparatus 504 does not have the function of receiving broadcast signals. The first reproducing apparatus 503 and the second reproducing apparatus 504 belong, for example, to a group of the same network in the same household.

The first reproducing apparatus 503 in the present embodiment is different from the first reproducing apparatus 103 in the above-described first embodiment in terms of the internal web server 115 and the separating module 114 being deleted and the web browser 112 being changed to a web browser 512 the processing of which is different from that of the web browser 112.

A receiver 525 and a transmitter 526 of a first web content processor 523 in the web browser 512 carry out communications with the web server 502 to acquire web content that is executed by the first web content processor 523. The receiver 525 and the transmitter 526 specify an acquiring destination of the web content in various methods conceivable such as specifying it from a URL entered by the user and such.

The receiver 525 and the transmitter 526 carry out receiving and transmitting for acquiring a reference time with the web server 502. More specifically, the transmitting and receiving destination of the content, the reference time, and such is changed from the internal web server 115 in the first embodiment to the web server 502. The other processes of the receiver 525 and the transmitter 526 are the same as those of the receiver 125 and the transmitter 126 in the first embodiment, respectively, and thus, their explanations are omitted.

In the second reproducing apparatus 504, the web browser 132 in the first embodiment is changed to a web browser 532. In the web browser 532, a receiver 545 and a transmitter 546 of a second web content processor 543 carry out communications with the web server 502 to acquire the web content that is executed by the second web content processor 543.

The receiver 545 and the transmitter 546 further carry out receiving and transmitting for acquiring the reference time with the web server 502, respectively. More specifically, the transmitting and receiving destination of the content, the reference time, and such are changed from the internal web server 115 in the first embodiment to the web server 502. The other processes of the receiver 545 and the transmitter 546 are the same as those of the receiver 145 and the transmitter 146 in the first embodiment and thus, their explanations are omitted.

The web server 502 in the present embodiment is different from the web server 102 in the first embodiment in terms of a reference time acquiring module 561, a transmitter 562, a receiver 563, and a system clock 564 being added. In the following explanation, the same constituent elements as those in the first embodiment are given the same numerals, and their explanations are omitted.

The web server 502 comprises the system clock 564, the reference time acquiring module 561, the transmitter 562, and the receiver 563.

When the transmitter 562 receives an acquiring request for reference time from any one of a plurality of web content processors (the first web content processor 523 and the second web content processor 543), the transmitter 562 transmits the acquiring request to the first web content processor 523.

The system clock 564 is a clock built in the web server 502 and outputs time information.

The receiver 563 receives acquisition source information indicating an acquisition source of reference time and such from the first web content processor 523.

FIG. 6 is a table illustrating an example of acquisition source information according to the present embodiment. As illustrated in FIG. 6, the acquisition source information comprises an acquisition source of reference time, an offset to reference time of acquisition source, and a reproduction speed at acquisition source. In the present embodiment, an example of the acquisition source of reference time to be the system clock 564 of the web server 502, the offset to reference time of acquisition source to be 12:15:00, Aug. 31, 2011, and the reproduction speed at acquisition source to be double speed is exemplified.

The reference time acquiring module 561 acquires time information from the acquisition source indicated by the acquisition source information (the system clock 564 in the present embodiment) for calculation of reference time information. The reference time acquiring module 561 in the present embodiment derives the reference time information from Expression 2, as the same as that in the first embodiment, based on the time information, the offset to reference time of acquisition source of 12:15:00, Aug. 31, 2011, and the reproduction speed at acquisition source of double speed acquired.

The transmitter 562 of the web server 502 then transmits the reference time information, the server processing time information, and the reproduction speed at acquisition source to the web content processor of the source of acquiring request for reference time (the first web content processor 523 or the second web content processor 543).

The processing procedure when acquiring a reference time is the same as the sequence diagram illustrated in FIG. 4 except for the internal web server 115 being substituted with the web server 502 and thus, its explanation is omitted.

As illustrated in the present embodiment, even when the web server 502 is arranged outside of the group of the same network in the same household and such, the same effect as that of the first embodiment can be obtained.

Third Embodiment

In the first embodiment and the second embodiment, the second reproducing apparatus is exemplified as not receiving broadcast signals. However, the second reproducing apparatus is not restricted as not to receive broadcast signals. Therefore, in a third embodiment, an example in which the second reproducing apparatus receives broadcast signals will be explained.

Figure 7:
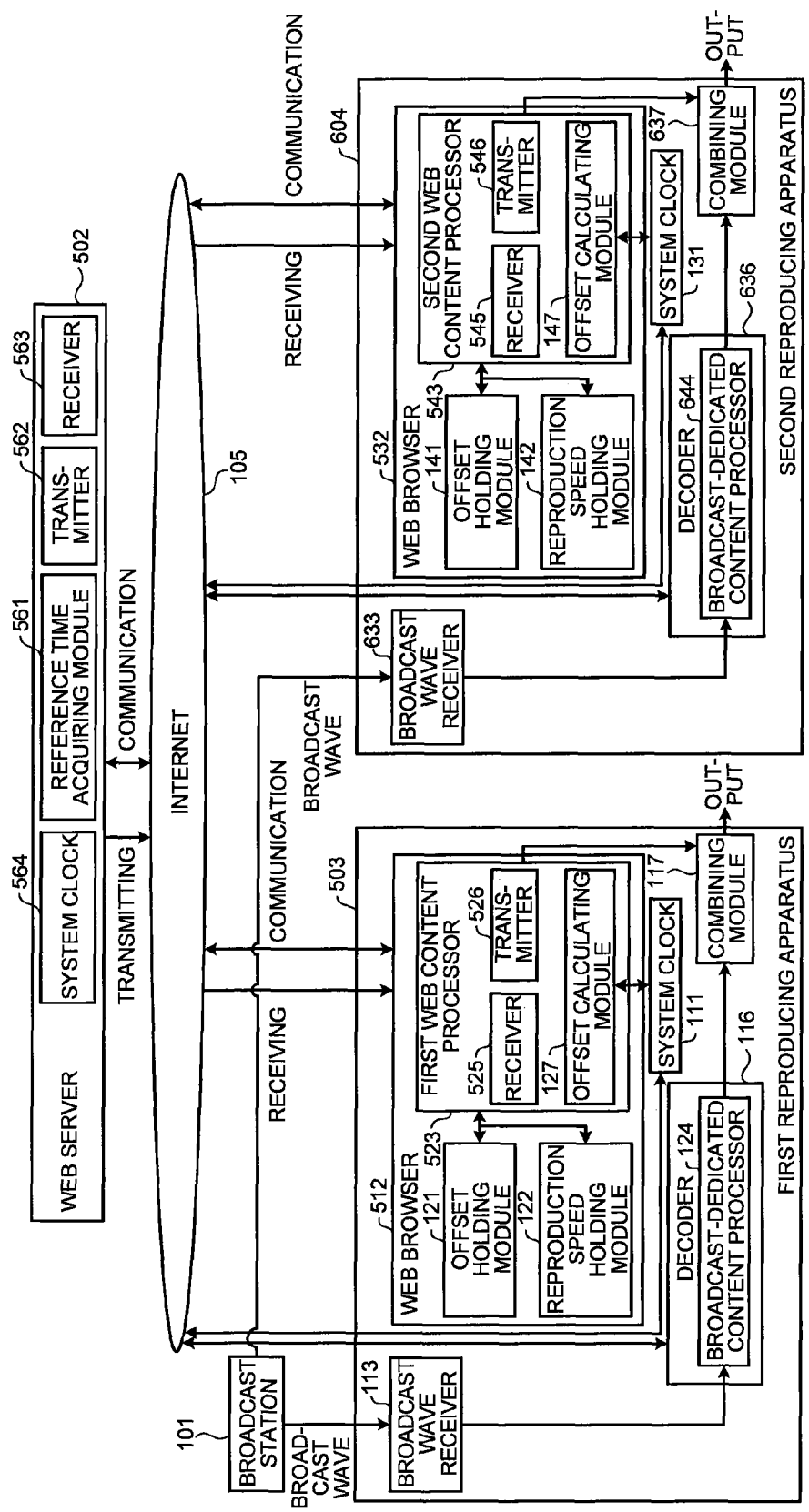
FIG. 7 is an exemplary block diagram schematically illustrating a content processing system comprising a plurality of reproducing apparatuses, a broadcast station, and a web server according to a third embodiment.

FIG. 7 is a schematic block diagram illustrating a content processing system comprising a plurality of reproducing apparatuses, a broadcast station, and a web server according to the third embodiment. In the following explanation, the same constituent elements as those in the above-described second embodiment are given the same numerals, and their explanations are omitted.

A second reproducing apparatus 604 in the present embodiment is different from the second reproducing apparatus 504 in the second embodiment in terms of a broadcast wave receiver 633, a decoder 636, and a combining module 637 being added.

The broadcast wave receiver 633 receives a broadcast signal from the broadcast station 101. The broadcast wave receiver 633 comprises a tuner and a demodulator not depicted, and receives broadcast signals and tunes to the signal of a channel specified by a channel selecting operation of the user. The broadcast wave receiver 633 carries out a demodulation process to the broadcast signal tuned corresponding to the broadcasting system thereof. For example, the broadcast wave receiver 633 carries out a digital demodulation process such as phase shift keying (PSK) demodulation or orthogonal frequency division multiplexing (OFDM) demodulation for a broadcast signal of digital broadcasting. The broadcast wave receiver 633 thus acquires a stream that includes desired content from the broadcast signal. The broadcast wave receiver 633 then decodes the stream and outputs the decoded stream to the decoder 636.

The decoder 636 comprises a broadcast-dedicated content processor 644. The broadcast-dedicated content processor 644 carries out an appropriate signal processing to the broadcast-dedicated content received. The decoder 636 then acquires a video signal and a sound signal of the program from the broadcast-dedicated content after the signal processing being carried out, and outputs the signals to the combining module 637.

The combining module 637 combines the video signal and the sound signal of the program after the signal processing being carried out by the decoder 636 with the content output from the web browser 532 and outputs the video signal and the sound signal combined.

Fourth Embodiment

In the third embodiment, the second reproducing apparatus is exemplified to receive broadcast signals. The second reproducing apparatus may separate the content-acquiring content from a broadcast signal as the same as the reproducing apparatus in the first embodiment. Therefore, in a fourth embodiment, an example in which each of a plurality of reproducing apparatuses acquires the content-acquiring content from a broadcast signal will be explained.

Figure 8:
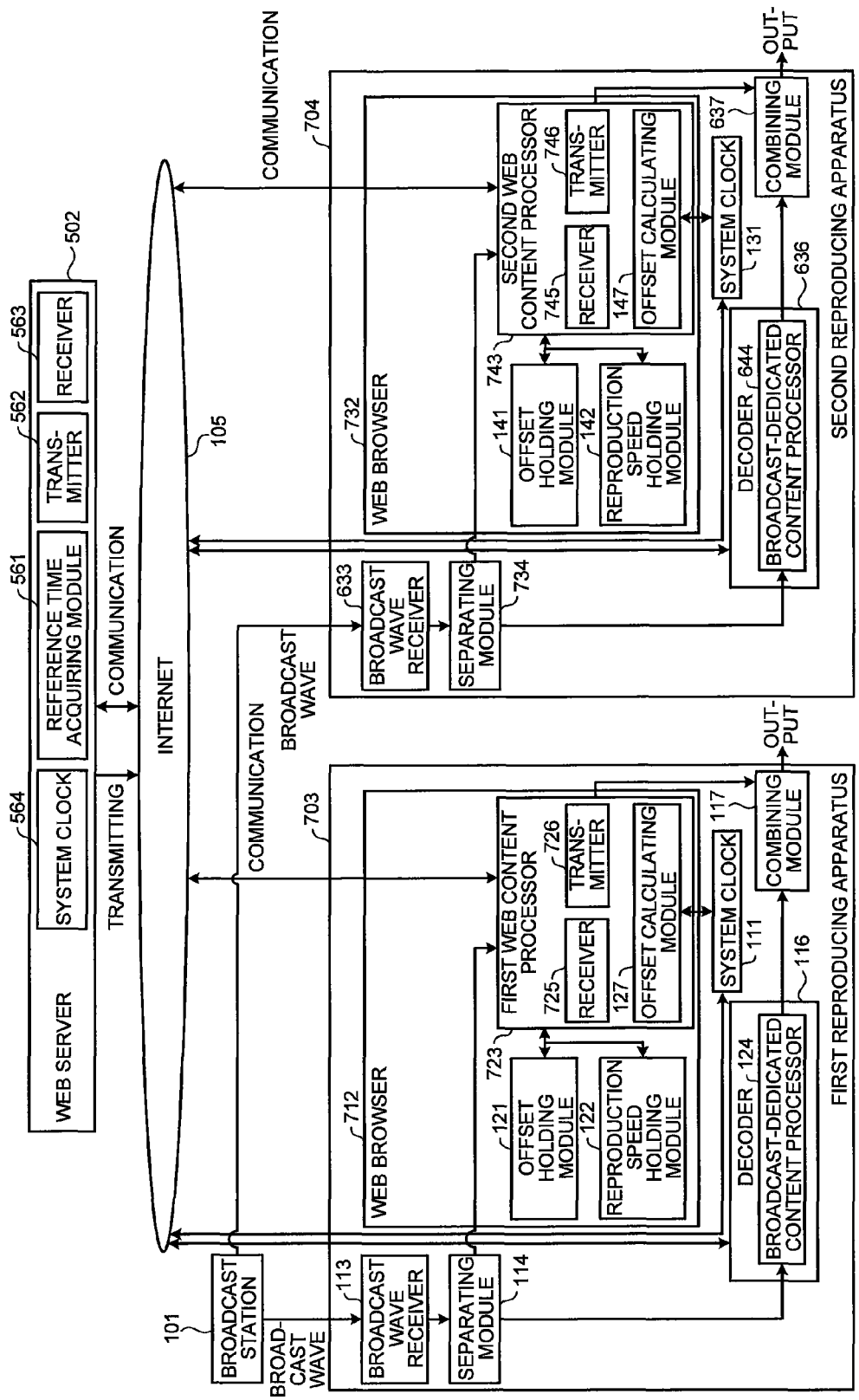
FIG. 8 is an exemplary block diagram schematically illustrating a content processing system comprising a plurality of reproducing apparatuses, a broadcast station, and a web server according to a fourth embodiment.

FIG. 8 is a schematic block diagram illustrating a content processing system comprising a plurality of reproducing apparatuses, a broadcast station, and a web server according to the fourth embodiment. In the following explanation, the same constituent elements as those in the third embodiment are given the same numerals and thus, their explanations are omitted.

As illustrated in FIG. 8, in the fourth embodiment, a web browser 712 of a first reproducing apparatus 703 is exemplified to be different from the web browser 512 in the third embodiment. Furthermore, the first reproducing apparatus 703 comprises the separating module 114 described in the first embodiment.

The separating module 114 outputs the content-acquiring content separated to a first web content processor 723.

The web browser 712 comprises the first web content processor 723. A transmitter 726 and a receiver 725 of the first web content processor 723 acquire web content from the web server 502 according to the content-acquiring content received.

In the fourth embodiment, a web browser 732 of a second reproducing apparatus 704 is exemplified to be different from the web browser 532 in the third embodiment. Furthermore, the second reproducing apparatus 704 comprises a separating module 734.

The separating module 734 extracts broadcast-dedicated content of a desired program from the decoded result, and at the same time, separates the content-acquiring content from a data broadcasting multiplexed to the broadcast signal. The separating module 734 outputs the broadcast-dedicated content to the decoder 636. The separating module 734 further outputs the content-acquiring content to a second web content processor 743 of the web browser 732. The content-acquiring content separated by the separating module 734 may be different from or may be the same as the content-acquiring content separated by the separating module 114 of the first reproducing apparatus 703.

The web browser 732 of the second reproducing apparatus 704 comprises the second web content processor 743. A transmitter 746 and a receiver 745 of the second web content processor 743 acquire the web content from the web server 502 according to the content-acquiring content received. The subsequent processes are the same as those in the above-described embodiment and thus, their explanations are omitted.

In the foregoing embodiments, the synchronization to be made with reference to the broadcast-dedicated content by receiving a broadcast signal from the broadcast station 101 is exemplified. However, the acquiring destination of the broadcast-dedicated content is not restricted to the broadcast station 101, and the synchronization may be made with reference to the broadcast-dedicated content recorded in advance in the first reproducing apparatus.

In the foregoing embodiments, as the acquisition source to acquire the reference time, the examples using broadcast-dedicated content, a system clock of a server, a system clock of a reproducing apparatus, and such are explained. However, the acquisition source may be other devices such as a time synchronization server.

The web browser is not restricted to comprise the offset holding module, the reproduction speed holding module, and the web content processor in advance, and the offset holding module, the reproduction speed holding module, and the web content processor may be realized by plug-ins and the like to be installed in the web browser.

Conventionally, when reproducing a plurality of pieces of related content delivered using broadcast waves and the Internet, it is required to process the content by synchronizing with each other. Therefore, in the above-described embodiments, each of a plurality of reproducing apparatuses processes the content according to the reference time information. Consequently, the synchronized processes become possible without successively carrying out inquiries for the timing or the time.

Furthermore, the internal web server or the web server has the function of calculating the reference time information based on the acquisition source of reference time and such acquired from the web content processor of each of the reproducing apparatuses, and provides the reference time information to the respective reproducing apparatuses. That the internal web server or the web server arbitrating the sharing of the reference time in this way allows simplifying the implementation of the web browser and the web content that is executed by the web content processor.

In the above-described embodiments, the web browser holds the offset time of the system time and the reproduction speed, and the web content processor calculates the reference time information from the system time, the offset time, and the reproduction speed. Accordingly, because the reference time can be derived from the system time, the amount of communication for sharing the reference time can be reduced. As a consequence, the processing burden on the respective reproducing apparatuses can also be reduced.

The web browsers executed in the first and the second reproducing apparatuses or the plug-in programs to be installed in the web browsers in the embodiments are provided in files in an installable format or an executable format recorded on a computer readable recording medium such as a CD-ROM, a flexible disk (FD), a CD-R, and a digital versatile disk (DVD).

The web browsers executed in the reproducing apparatuses or the plug-in programs to be installed in the web browsers in the embodiments may be configured, by storing them in a computer connected to a network such as the Internet, to be provided by downloading via the network. Moreover, the web browsers executed in the reproducing apparatuses or the plug-in programs to be installed in the web browsers in the embodiments may be configured to be provided or distributed via a network such as the Internet.

The web browsers or the plug-in programs to be installed in the web browsers in the embodiments may be configured to be provided being embedded in advance in a ROM and such.

The web browsers executed in the reproducing apparatuses or the plug-in programs to be installed in the web browsers in the embodiments are modularly configured including the respective modules described above. As for the actual hardware, by a CPU (processor) reading out and executing the web browser or the plug-in programs to be installed in the web browser from the foregoing recording medium, the respective modules are loaded on a main storage device and each of the modules are generated on the main storage device.

Moreover, the various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A content processing apparatus comprising:
a transmitter configured to transmit, when the transmitter receives an acquiring request for reference time to determine a timing to synchronize a plurality of pieces of content executed by a plurality of executing modules with each other from a first executing module out of the executing modules, the acquiring request for the reference time to a second executing module out of the executing modules;
a receiver configured to receive acquisition source information indicating an acquisition source of the reference time from the second executing module; and
an acquiring module configured to acquire reference time information indicating the reference time from the acquisition source indicated by the acquisition source information, wherein
the transmitter is further configured to transmit to the first executing module, together with the reference time information, processing time information indicating processing time from receiving the acquiring request until transmitting the reference time information, the processing time information being used to calculate a time lag between time in the first executing module and the reference time.

2. The content processing apparatus of claim 1, further comprising:
a time acquiring module configured to acquire time counted in the content processing apparatus; and
the second executing module, wherein
the second executing module comprises a calculating module configured to calculate offset time indicating a time lag between the time acquired by the time acquiring module and the reference time, the offset time being obtained by subtracting the reference time from first specific time, the first specific time being obtained by adding, to output time indicating time when the second executing module outputs the acquiring request to the transmitter, one-way communication time obtained by dividing by two first time, the first time being obtained by subtracting the processing time from total processing time indicating time from the output time until second time when the second executing module receives the reference time information transmitted from the transmitter, and
the second executing module is configured to execute content according to the reference time which is obtained by adding the time acquired by the time acquiring module to the offset time.

3. The content processing apparatus of claim 1, further comprising:
a broadcast receiver configured to receive a broadcast signal; and
a separating module configured to separate content executed by at least one of the executing modules from the broadcast signal,
wherein
the transmitter is further configured to transmit the content separated by the separating module to at least one of the executing modules.

4. The content processing apparatus of claim 3, wherein the content separated by the separating module contains a computer program or a script in which processing of other content to be executed by at least one of the executing modules is described.

5. The content processing apparatus of claim 1, wherein
the receiver is further configured to receive reproduction speed information indicating a reproduction speed of content, and
the transmitter is further configured to transmit the reproduction speed information to the first executing module.

6. A content processing apparatus comprising:
a time acquiring module configured to acquire time;
a transmitter configured to transmit an acquiring request for reference time to determine a timing to synchronize a plurality of pieces of content executed by a plurality of executing modules with each other to a processing device providing reference time information indicating the reference time;
a receiver configured to receive the reference time information and processing time information indicating processing time for the processing device from receiving the acquiring request until transmitting the reference time information;
a calculating module configured to calculate offset time indicating a time lag between the time acquired by the time acquiring module and the reference time, the offset time being obtained by subtracting the reference time from first specific time, the first specific time being obtained by adding, to transmitted time indicating time when the transmitter transmits the acquiring request, one-way communication time obtained by dividing by two first time, the first time being obtained by subtracting the processing time from total processing time indicating time from the transmitted time until second time when the receiver receives the reference time information; and
an executing module configured to execute content according to the reference time which is obtained by adding the offset time to the time acquired by the time acquiring module.

7. A content synchronizing method executed in a content processing apparatus, the content synchronizing method comprising:
first transmitting, by a transmitter, when the transmitter receives an acquiring request for reference time to determine a timing to synchronize a plurality of pieces of content executed by a plurality of executing modules with each other from a first executing module out of the executing modules, the acquiring request for the reference time to a second executing module out of the executing modules;
receiving, by a receiver, acquisition source information indicating an acquisition source of the reference time from the second executing module; and
acquiring, by an acquiring module, reference time information indicating the reference time from the acquisition source indicated by the acquisition source information; and
second transmitting, by the transmitter, to the first executing module, together with the reference time information, processing time information indicating processing time from receiving the acquiring request until transmitting the reference time information, the processing time information being used to calculate a time lag between time in the first executing module and the reference time.

* * * * *